United States Patent [19]
Miyahara et al.

[11] Patent Number: 6,086,209
[45] Date of Patent: Jul. 11, 2000

[54] MIRROR HOLDER AND OPTICAL AXIS CORRECTING DEVICE USING THE SAME

[75] Inventors: Kiyohiko Miyahara; Hidehiro Kawaguchi; Toshihisa Iriyama, all of Kanagawa; Kazuhiko Otsuka, Chiba, all of Japan

[73] Assignee: Sony Corporation, Tokyo, Japan

[21] Appl. No.: 09/293,237

[22] Filed: Apr. 16, 1999

[30] Foreign Application Priority Data

Apr. 20, 1998 [JP] Japan .................................. 10-109888

[51] Int. Cl.$^7$ ..................................................... G02B 7/182
[52] U.S. Cl. ............................................. 359/872; 359/225
[58] Field of Search .................................... 359/199, 223, 359/224, 225, 226, 871, 872, 876; 369/44.15, 44.16

[56] References Cited

U.S. PATENT DOCUMENTS

| | | | |
|---|---|---|---|
| 5,353,167 | 10/1994 | Kuklo et al. ............................ | 359/876 |
| 5,543,956 | 8/1996 | Nakagawa et al. ..................... | 359/225 |
| 5,739,941 | 4/1998 | Knipe et al. ............................ | 359/224 |
| 5,946,152 | 8/1999 | Baker ..................................... | 359/872 |

*Primary Examiner*—Cassandra Spyrou
*Assistant Examiner*—Mark A. Robinson
*Attorney, Agent, or Firm*—Frommer Lawrence & Haug, LLP; William S. Frommer

[57] ABSTRACT

Disclosed is an optical axis correcting device which allows high accuracy optical axis adjustment and which has an excellent responsiveness. An optical communication device suited for long distance optical communication using this optical axis correcting device is provided. A two-axis spring for setting a mirror includes a first annular section, a second annular section on the outer side of the first annular section and concentric thereto, and a third annular section on the outer side of the second annular section and concentric thereto, wherein the first annular section and the second annular section are connected together by a pair of X-axis bridges which allow torsional rotation and which are opposed to each other with the center of the concentric circle therebetween, wherein the second annular section and the third annular section are connected together by similar Y-axis bridges. The X-axis bridges and the Y-axis bridges are arranged at a predetermined angle by using the center of the concentric circles as a reference, and are arranged so as to exhibit the same angle with respect to the rolling direction of the rolled members forming the two-axis spring using the center of the concentric circles as a reference.

4 Claims, 9 Drawing Sheets

MIRROR HOLDER AND OPTICAL AXIS CORRECTING DEVICE USING THE SAME

BACKGROUND OF THE INVENTION

1. Field of the Invention

The present invention relates to a mirror holder for adjusting the optical axis of an optical communication device and to an optical axis correcting device using the same.

2. Description of the Related Art

Nowadays, due to the shortage in radio wave resources and the requisite complicated procedures for installing wireless or wire communication devices, researches are being assiduously conducted for putting optical communication into practical use.

However, no device has been realized yet which provides a sufficient performance in long distance optical communication in the order of kilometers.

A conventional example of an optical communication device which is capable of long-distance two-way optical communication will be described with reference to FIGS. 9 through 11. FIG. 9 illustrates the optical system of a conventional optical communication device; FIG. 10 illustrates the optical axis adjusting method for this optical communication device; and FIG. 11 illustrates another optical axis adjusting method.

First, the operation of the transmission system will be described. As shown in FIG. 9, a beam from a semiconductor laser 41 modulated on the basis of a transmission signal is converted to a parallel beam by a lens 42 and impinges upon a beam splitter 43. The beam from the beam splitter 43 impinges upon a concave lens 44 in the output direction, and is enlarged by the lens 44 before it is converted to a substantially parallel beam by a main lens 45. The beam is then output as transmission beam Lout toward the optical communication device at the other end (not shown).

Next, the operation of the reception system will be described. The reception beam Lin from the optical communication device at the other end is received by the main lens 45 and converted to a parallel beam by the lens 44. It is then divided by a beam splitter 46 into a beam in the direction of a position detection sensor 48 condensed by a lens 47 and a beam in the direction of a photoreceptor 50 condensed by a lens 49. The output from the photoreceptor 50 is demodulated as the reception signal to restore the signal.

In the optical communication device having the above-described optical system, it is necessary for the optical axis on the transmission side to coincide with the optical axis on the reception side. However, the optical system unit is influenced by external factors such as wind, vibrations generated inside the device, changes in the ambient temperature, etc., and a deviation in the optical axes is generated. In long distance communication, a minute deviation in the optical axes interferes with the communication, so that it is necessary to perform correction to make the optical axes coincide with each other.

Various conventional methods for compensating for this optical axis deviation have been proposed.

One of these conventional methods adopts the construction as shown in FIG. 10, in which the above-described optical system is integrally accommodated in a lens barrel 61. The lens barrel 61 is supported by an intermediate ring 62 by means of upper and lower X-axis bearings 65 so as to be rotatable in the X-axis direction. The rotation of an X-axis motor 63 fastened to the intermediate ring 62 is transmitted to a driven gear 66 fastened to the X-axis bearing 65 through the intermediation of a driving gear 64 to rotate the lens barrel 61 in the X-axis direction. Further, the intermediate ring 62 is supported on a seat 71 by right and left Y-axis bearings 69 so as to be rotatable in the Y-axis direction. The rotation of a Y-axis motor 67 fastened to the seat 71 is transmitted to a driven gear 70 fastened to the Y-axis bearing 69 through intermediation of a driven gear 68, and the intermediate ring 62, in other words, the lens barrel 61, is rotated in the Y-axis direction. The X-axis motor 63 and the Y-axis motor 67 are controlled on the basis of the detection output of the position detection sensor 48 of the above-described optical system, and are controlled so as to effect coincidence in optical axis between the devices.

However, in the above-described construction, the lens barrel 61 as a whole is used as an operating section, so that the inertial mass is large. Thus, it is rather poor in control responsiveness. Further, it requires a high-accuracy, highly rigid bearing and a motor with large driving power. Further, since the optical axis adjustment has to be performed in minute angles, the motor and the torque transmission mechanism must be ones of high accuracy which are free from backlash.

FIG. 11 shows another example. In this example, there are adopted a pair of correcting sections which are arranged perpendicular to each other in the optical path: an X-axis mirror 81 and an X-axis motor 82 for rotating this, and a Y-axis mirror 83 and a Y-axis motor 84 for rotating this. To perform angular correction of each mirror, the X-axis motor 82 and the Y-axis motor 84 are rotated to control the X-axis mirror 81 and the Y-axis mirror 83, constantly effecting coincidence in optical axis between the devices.

However, in this method also, a mirror and a motor are required for each optical axis correcting direction, with the result that the construction of the optical axis correcting device is complicated. Further, as in the above-described example, the motor and the mechanism section for transmitting torque must be highly accurate ones free from backlash.

As a means for solving the above problem, the present inventors have proposed an optical axis correcting device, which is described in Japanese Patent application No. 10-14533. In this optical axis correcting device, an optical axis correcting mirror is held at the center of a mirror holder (hereinafter referred to as "2-axis spring") so as to be independently rotatable around two axes on the mirror surface. The 2-axis spring has three concentric annular sections formed of thin elastic rolled plates, with connecting sections being provided between the annular sections so as to allow torsional rotation.

However, generally speaking, a rolled member exhibits different physical characteristics between the rolling direction and a direction perpendicular thereto, the control characteristics of the two axes differing depending upon the positional relationship between the two connecting sections and the rolling direction. Further, the metal material exhibits a small internal loss attenuating vibration, and once vibration is generated, it is hard to attenuate.

SUMMARY OF THE INVENTION

Accordingly, it is an object of the present invention to provide a small and inexpensive correcting device which has an excellent controllability and which allows highly accurate optical axis adjustment, and to provide an optical communication device suitable for long distance optical communication by using the same.

In accordance with the present invention, there is provided a mirror holder formed of rolled members, comprising a first annular section for setting the mirror, a second annular section on the outer side of the first annular section and concentric thereto, and a third annular section on the outer side of the second annular section and concentric thereto, wherein the first annular section and the second annular section are connected together by a pair of first connecting sections which allow torsional rotation and which are opposed to each other with the center of the concentric circle therebetween, wherein the second annular section and the third annular section are connected together by a pair of second connecting sections which allow torsional rotation and which are opposed to each other with the center of the concentric circle therebetween, wherein the first connecting sections and the second connecting sections are arranged at a predetermined angle by using the center of the concentric circles as a reference, and wherein the first connecting sections and the second connecting sections are arranged so as to exhibit the same angle with respect to the rolling direction of the rolled member using the center of the concentric circles as a reference.

Constructed is a mirror holder wherein a member which restrains the vibration is added to the first connecting sections and the second connecting sections. As the member for restraining vibration, a semi-setting type resin adhesive is used.

Further, to solve the above problem, there is provided an optical axis correcting device comprising a mirror holder constructed as described above, a mirror attached to the first annular section of the mirror holder, a frame to which the third annular section of the mirror holder is fastened, a driving device which rotates the mirror by using the first connecting sections and the second connecting sections as independent rotation axes, a rotation angle detecting device for detecting the rotation angle of the mirror, and a limiting device for limiting the rotation angle of the mirror.

In the mirror holder constructed as described above, the same torsional characteristic is obtained with respect to the two rotation axes, thereby improving the rotation control performance of the mirror. Further, since a vibration restraining member is provided in the connecting section, a harmful vibration is quickly attenuated, thereby further improving the rotation control performance.

DETAILED DESCRIPTION OF THE PREFERRED EMBODIMENTS

Figure 1:
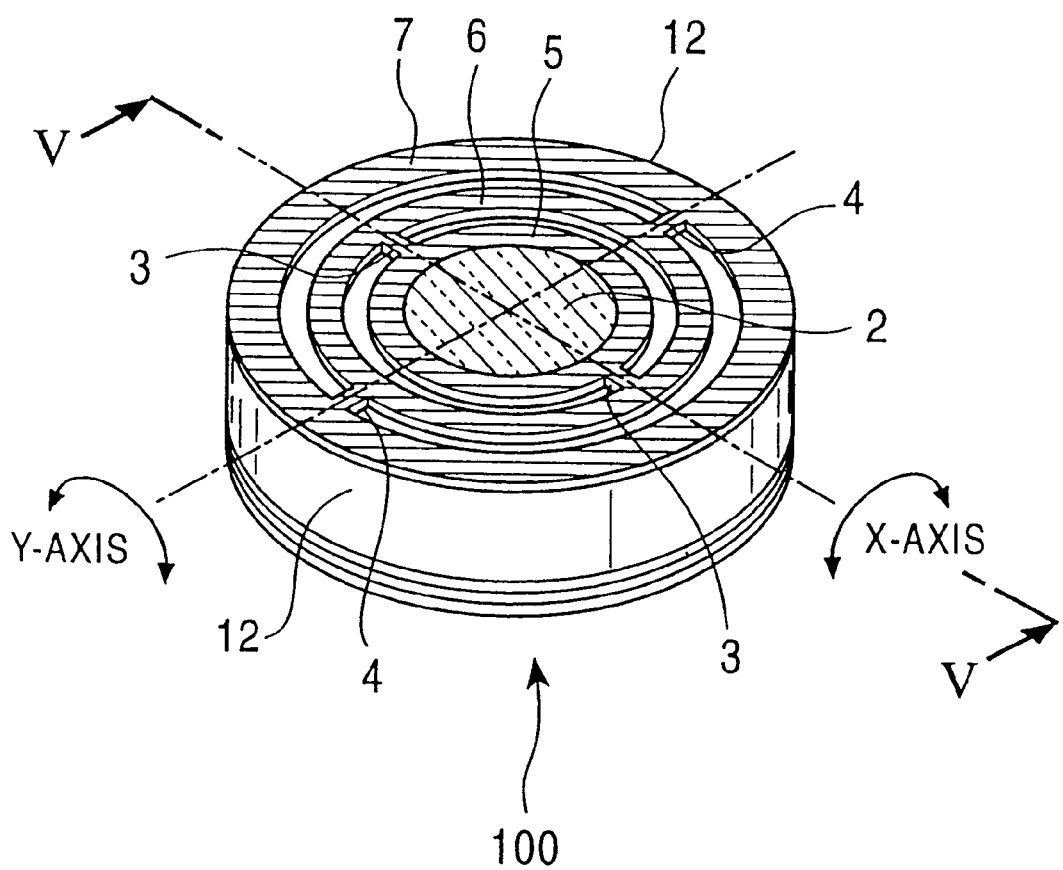
FIG. 1 is a perspective view of an optical axis correcting device according to the present invention.
Figure 2A:
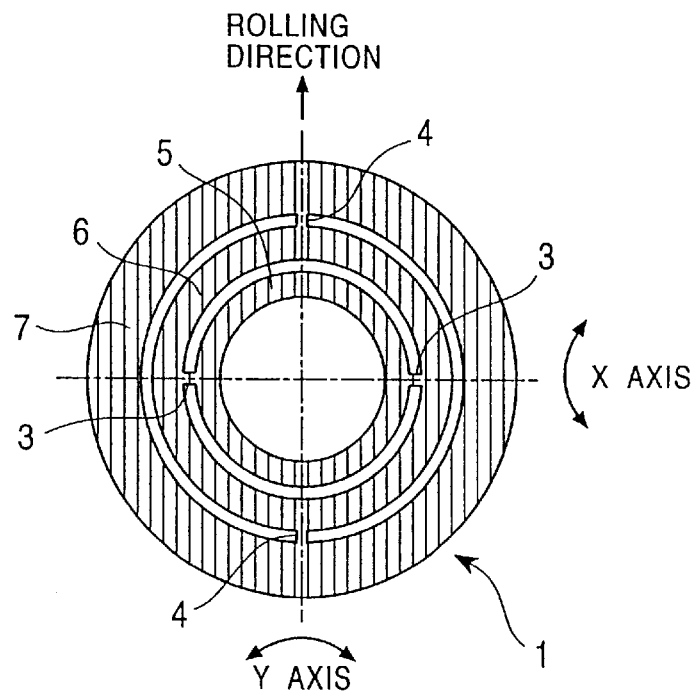
FIGS. 2A and 2B are plan views for illustrating the rolling direction of the thin plate member and the configuration of the two-axis spring.
Figure 2B:
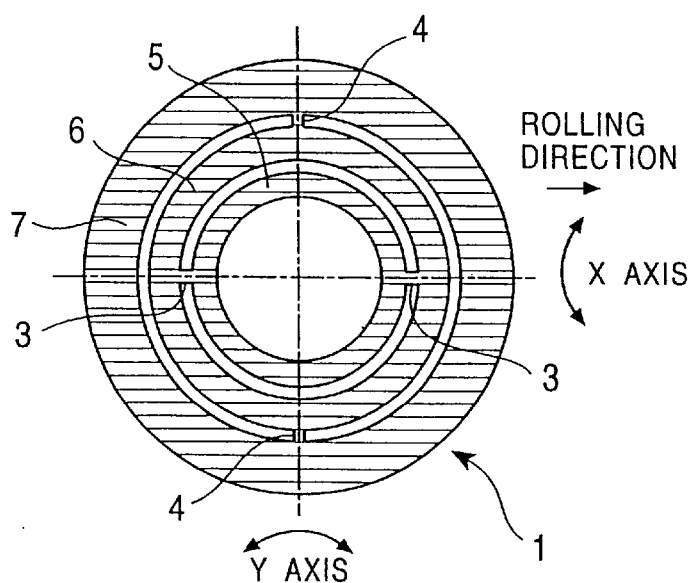
Figure 3:
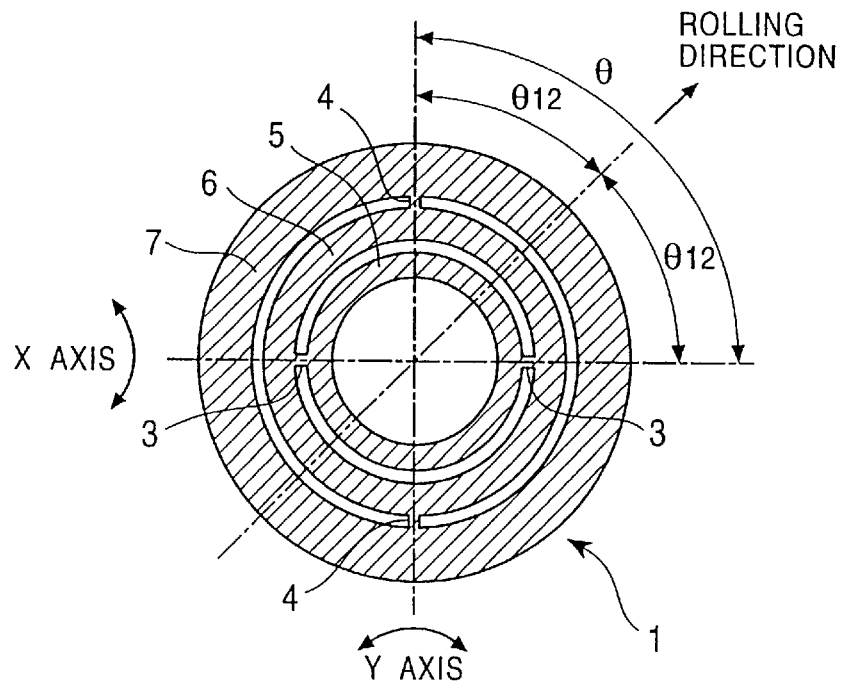
FIG. 3 is a plan view of the two-axis spring of the present invention.
Figure 4:
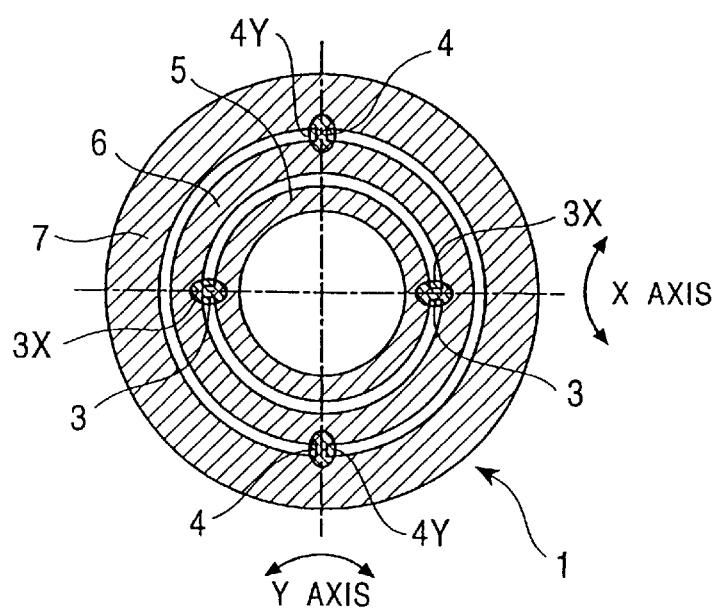
FIG. 4 is a plan view of the two-axis spring of the present invention.
Figure 5:
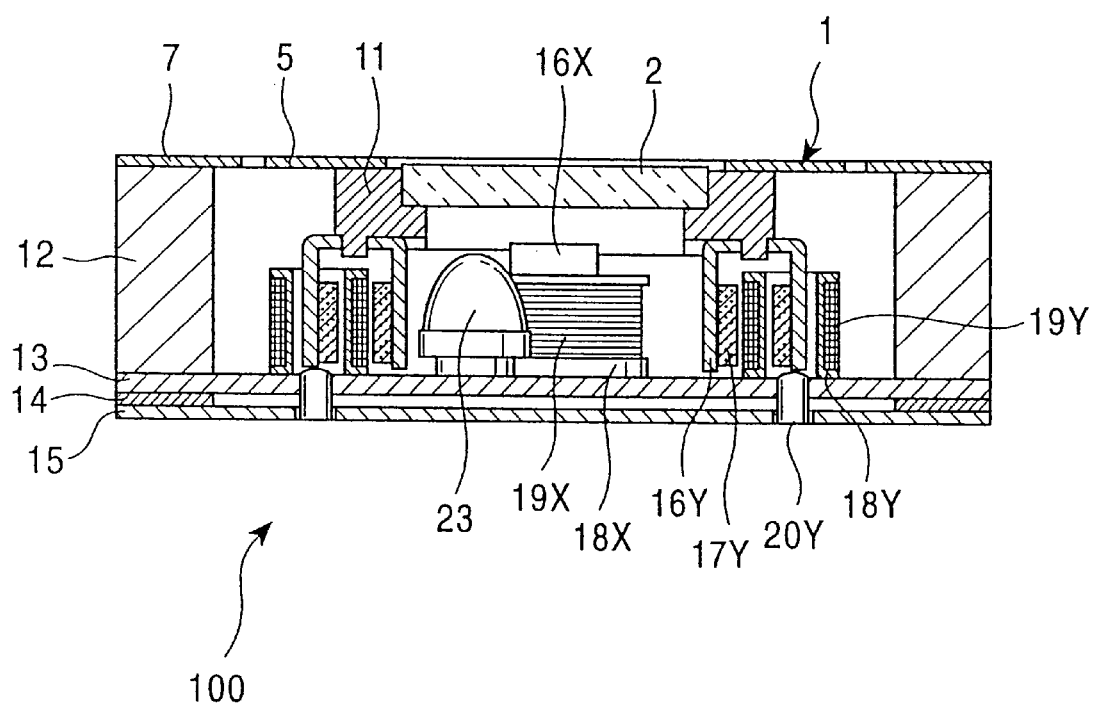
FIG. 5 is a sectional view taken along the line A—A of FIG. 1 of the optical axis correcting device using the two-axis spring of the present invention.
Figure 6:
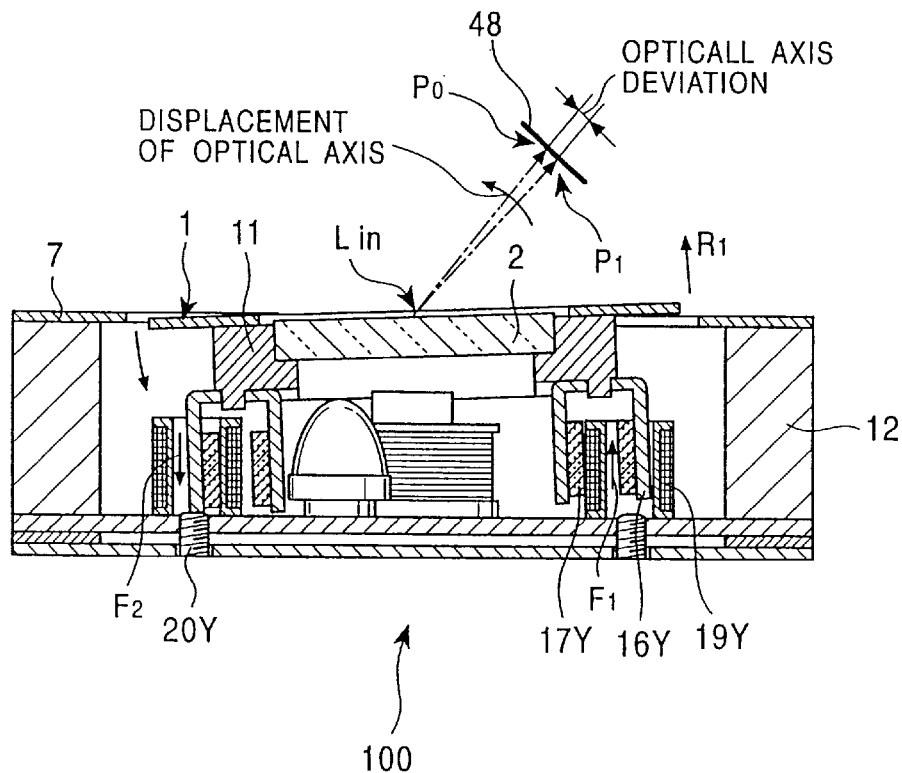
FIG. 6 is a diagram illustrating the operation of the optical axis correcting device.
Figure 7:
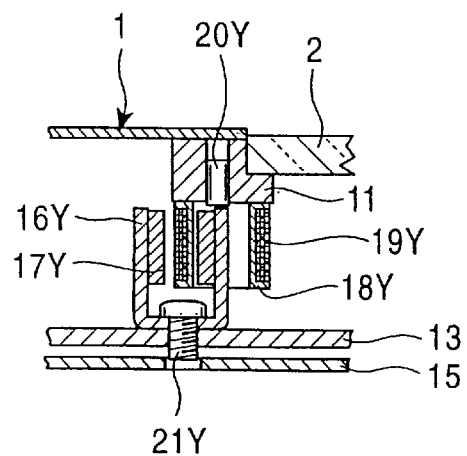
FIG. 7 is a sectional view showing another construction of the mirror drive section.
Figure 8:
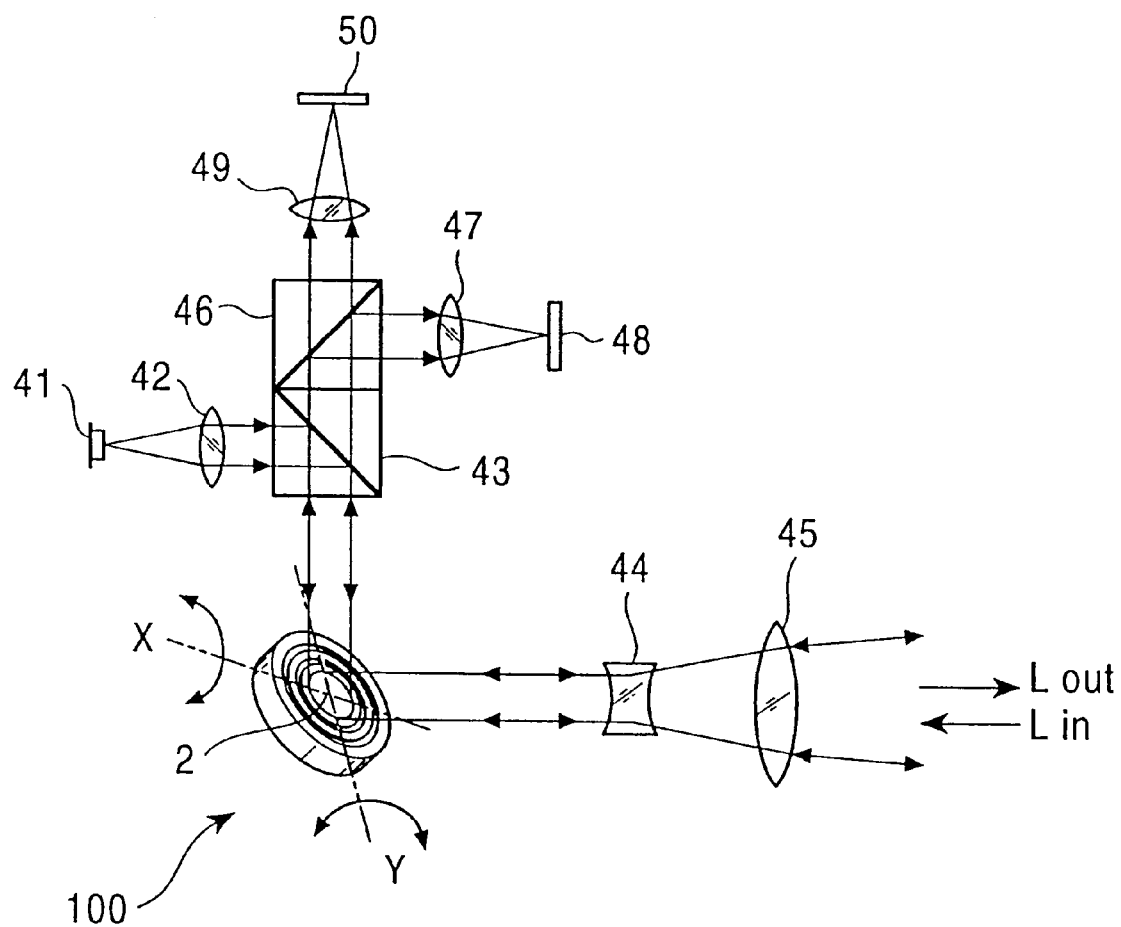
FIG. 8 is a diagram showing the optical system of an optical communication device using the optical axis correcting device shown in FIG. 1.
Figure 9:
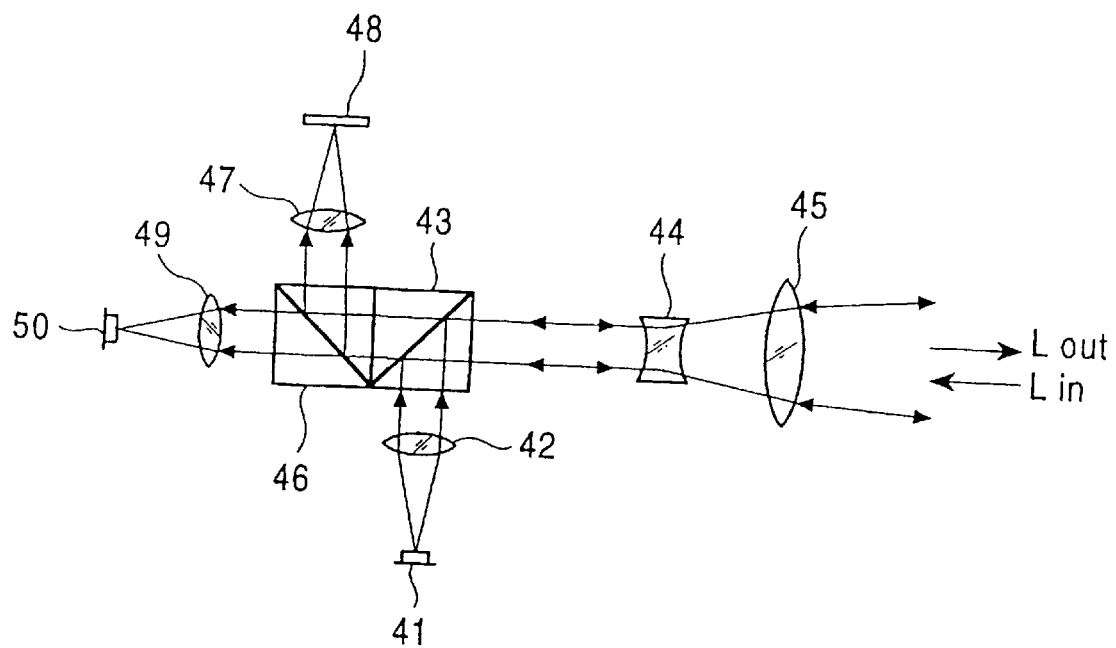
FIG. 9 is a diagram showing a conventional optical communication device.
Figure 10:
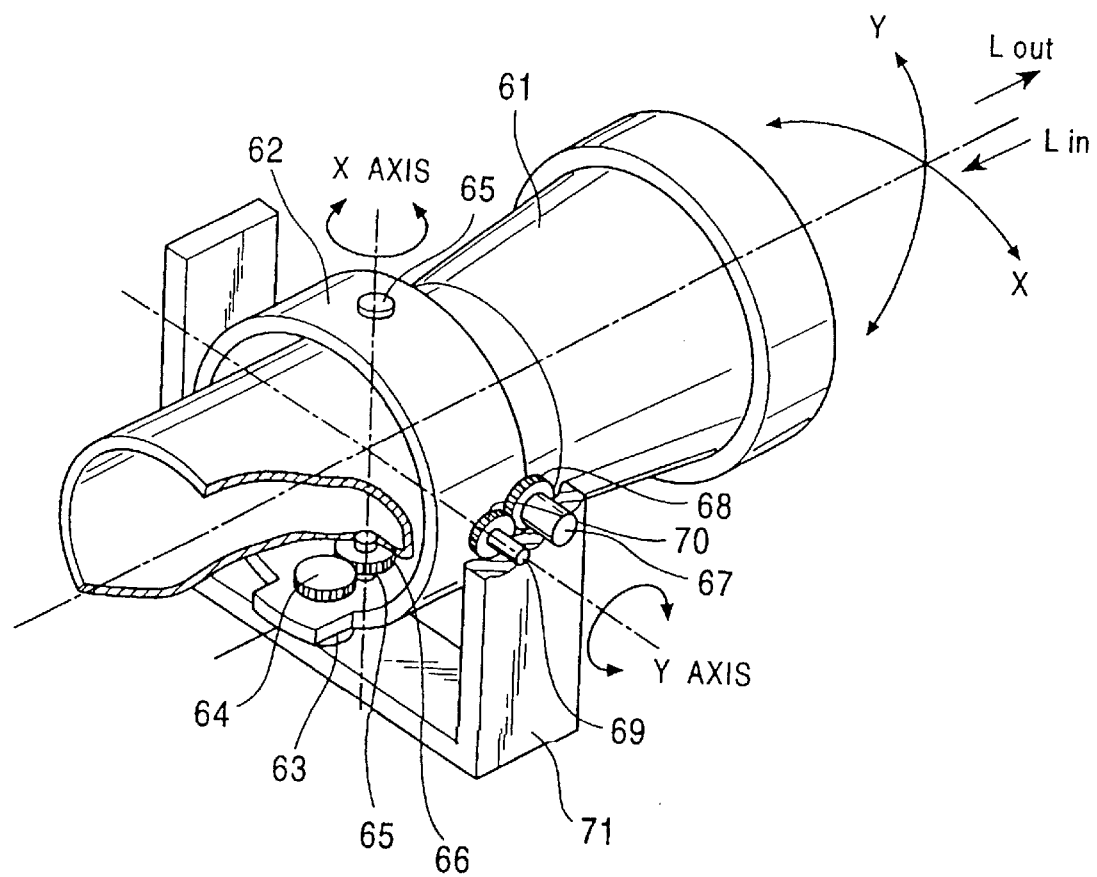
FIG. 10 is a diagram illustrating an optical axis adjusting method for the conventional optical communication device.
Figure 11:
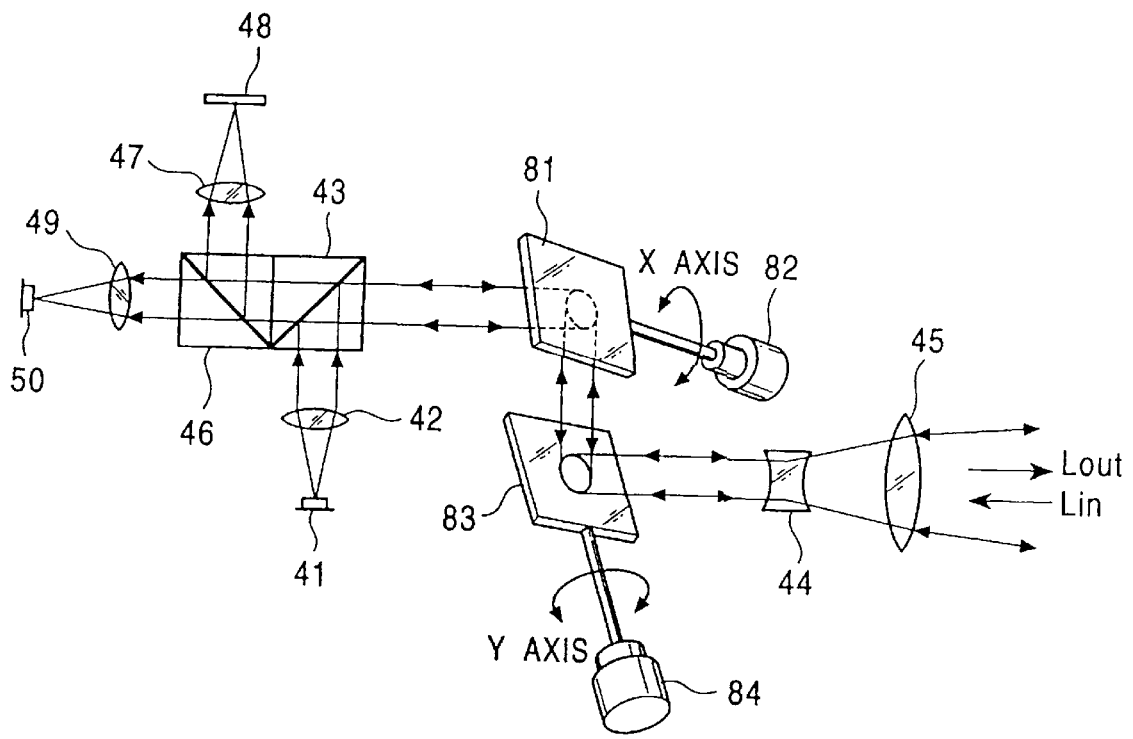
FIG. 11 is a diagram illustrating another optical axis adjusting method for the conventional optical communication device.

An embodiment of the present invention will be described with reference to FIGS. 1 through 8. FIG. 1 is a perspective view of an optical axis correcting device according to the present invention. FIGS. 2A and 2B are plan views for illustrating the rolling direction of the thin plate member and the configuration of the two-axis spring. FIGS. 3 and 4 are plan views of a two-axis spring according to the present invention. FIG. 5 is sectional view taken along the line A—A of FIG. 1 of the optical axis correcting device using the two-axis spring of the present invention. FIG. 6 is a diagram for illustrating the operation of this optical axis correcting device. FIG. 7 is a sectional view showing another construction of the mirror drive section. FIG. 8 is a diagram showing the optical system of an optical communication device using the optical axis correcting device shown in FIG. 1.

As stated above, the present inventors have proposed, as a means for controlling the optical axis of an optical communication device, an optical axis correcting device, which is disclosed in Japanese Patent application No. 10-14533. As shown in FIG. 1, in this optical axis correcting device 100, a mirror two for optical axis correction is held at the center of a two-axis spring 1 in such a manner that it can independently rotate around two axes which intersect on the mirror surface. The two-axis spring 1 comprises a first, innermost annular section 5 holding the mirror 2, a second, intermediate annular section 6, and a third, outermost annular section 7 fastened to a frame 12. The first annular section 5 and the second annular section 6 are rotatably connected by a pair of X-axis bridges 3, and the second annular section 6 and the third annular section 7 are rotatably connected by a pair of Y-axis bridges 4. The mechanism for driving the mirror 2, described in detail below, the mechanism for detecting the inclination thereof, etc. are accommodated in the frame 12. The present invention relates to this two-axis spring 1, wherein an optical axis correcting device is constructed by replacing the conventional two-axis spring 1 by this two-axis spring.

When preparing the two-axis spring 1 by using a rolled thin plate, it is particularly important that the rolling direction and the directions of the X-axis bridges 3 and the Y-axis bridges 4, connecting the annular sections, should be considered. Otherwise, a difference in characteristics will occur between the axis directions. For example, in FIG. 2A, the rolling direction coincides with the Y-axis bridges 4, and, in FIG. 2B, the rolling direction coincides with the X-axis bridges 3. In these conditions, the difference in characteristics between the two axes is maximum, with the controllability differing very much.

In view of this, in the present invention, there is proposed, as shown in FIG. 3, a two-axis spring 1 in which the rolling direction is between the X-bridges 3 and the Y-bridges 4. Assuming that the angle made by the X-axis and the Y-axis is θ, the angle made by the rolling direction and the two X-axis bridges 3, constituting the connecting sections between the first annular section 5 and the second annular section 6, is θ/2. Thus, similarly, the angle made by the rolling direction and the two Y-axis bridges 4, constituting the connecting sections between the second annular section 6 and the third annular section 7, is also θ/2. By thus determining the axes and the rolling direction, the characteristics of the two axes with respect to torsion, etc. are the same, so that the rotation control of the mirror 2 is effected in a stable manner, and the reliability of the optical axis correcting device using this is improved.

The angle θ made by the two intersecting axes may naturally be a right angle. Further, it goes without saying that it may be any angle as long as it is an effective angle which allows the two axes to rotate independently and which allows the normal direction with respect to the reflecting surface of the mirror 2 to be arbitrarily set.

Further, the two-axis metal spring 1 is little attenuable to vibrations. In view of this, vibration restraining members 3X formed of a material with large internal loss are provided in the vicinity of the X-axis bridges 3, and similar vibration restraining member 4Y are provided in the vicinity of the Y-axis bridges 4, as shown in FIG. 4. Semi-curing type resin adhesive, for example, is used as these vibration restraining members 3X and 4Y. Due to this arrangement, the vibration restraining property of the two-axis spring 1 is improved, and the control of the mirror is facilitated and stabilized, and the reliability of the optical axis correcting device is further improved.

Next, the optical axis correcting device 100 shown in FIG. 1, which uses the above-described two-axis spring 1, will be described. FIG. 5 is a sectional view taken along the line A—A of the optical axis correcting device 100 shown in FIG. 1. A mirror 2 is held by a mirror holder 11, and the mirror holder 11 is fastened to the first annular section 5 of the two-axis spring 1. The annular section 7 of the third annular section 7 of the two-axis spring 1 is fastened to the frame 12. Thus, the mirror 2 is held so as to be capable of independently rotating around the rotation axes determined by the X-axis bridges 3 and the Y-axis bridges 4 with respect to the frame 12.

A base plate 13 is fastened to the other end of the frame 12. Further, a substrate 15 is provided through the intermediation of an annular spacer 14. Inside the frame 12 closed by the base plate 13, there are provided a driving mechanism for independently rotating the mirror 2 in the direction of the two axes, and a mechanism for detecting the angle of the mirror 2.

The driving mechanism for rotating the mirror 2 comprises a magnetic circuit formed by a yoke 16Y and a magnet 17Y fastened to the mirror holder 11 side, and a coil 19Y wound around a bobbin fastened to the base plate 13, which form so-called moving magnet type voice coil motors. In the optical axis correcting device 100, these voice coil motors are provided at opposed positions, with the mirror 2 therebetween, generating torque in the same direction with respect to the rotation axis. The two voice coil motors shown in FIG. 5 generate torque around the Y-axis bridges 4. Similarly, the voice coil motors formed by a coil 19X wound around a bobbin 18X (no magnet corresponding thereto is shown) generate torque around the X-axis bridges 3.

A stopper 20Y limits the rotation amount of the voice coil motor with respect to the Y-axis. A similar stopper is provided with respect to the X-axis.

To detect the Y-axis angle of the mirror 2, a Y-axis angle detecting sensor 23 is fastened to the base plate 13, detecting the reflection from the reflecting surface provided on the back side of the mirror 2. Similarly, to detect the X-axis angle of the mirror 2, an X-axis angle detecting sensor is provided on the reader side as seen in FIG. 5. Further, the control, signal processing etc. of the voice coil motors, the sensors, etc. are conducted on the substrate 15. These form the optical axis correcting device 100.

The reflection point of the mirror 2 does not depend on the rotation angle of the mirror 2, and the position is not displaced. Displacement of the position, would result in the optical axis position of the optical system being changed.

Next, the operation of the above-described optical axis correcting device 100 will be described. As shown in FIG. 6, suppose, for example, the reception light Lin is reflected at the reflection point of the mirror 2 and then has reached point P1 on the position detecting sensor 48. The optical axis reference position is P0. By causing the reception light Lin to reach this point, the optical axis is correctly adjusted. For this adjustment, forces F1 and F2 are generated in the two voice coil motors on the basis of the optical axis deviation detected by the position detecting sensor 48, and the mirror 2 is rotated in the direction R1, causing the reception light Lin to reach the optical axis reference position P0. Generally speaking, the optical axis is deviated in planes including the two axis directions, and the position detecting sensor 48 independently detects the deviations in the two axis directions substantially perpendicular to each other. On the basis of the detection results, the X-axis motor and the Y-axis motor are controlled to adjust the inclination of the reflection surface of the mirror 2.

FIG. 7 shows another construction of the voice coil motor. The coil 19Y is fastened to the mirror holder 11 side, and the magnetic circuit formed by the yoke 16Y and the magnet 17Y are fastened to the base plate 13 to form a so-called moving coil type voice coil motor. The yoke 16Y is fastened to the base plate 13 by a bolt 21Y. The stopper 20Y is provided in the mirror holder 11 to limit the rotation angle.

It is naturally possible to either type of voice coil motor.

Next, the optical system of an optical communication device using the optical axis correcting device 100 will be described. In the example shown in FIG. 8, the optical axis correcting device 100 is provided between the lens 44 in the direction of the other communication end and the beam splitter 43 in the direction of the photoreceptor 50.

First, regarding the reception optical system, the reception light Lin from the other communication device is received by the main lens 45 and converted to a parallel beam by the lens 44. After this, it is reflected by the mirror 2 of the optical axis correcting device 100 and led to the beam splitter 43. Further, it is divided by the beam splitter 46 into a beam in the direction of the position detecting sensor 48 condensed by the lens 47 and a beam in the direction of the photoreceptor 50 condensed by the lens 49. As described above, the deviation of the optical axis in the plane is detected by the position detecting sensor 48, and, on the basis of the detection result, the angle of the mirror 2 of the optical axis correcting device 100 is controlled to move the optical axis to correct the optical axis.

Regarding the transmission optical system, the transmission beam Lout from the semiconductor beam 41 is converted to a parallel beam by the lens 42 and then impinges upon the beam splitter 43 to be put on the same optical axis as the reception beam Lin, so that the optical axis of the transmission beam Lout is simultaneously corrected.

Due to the two-axis spring of the present invention and the optical axis correcting device using the same, it is possible to control the mirror in the same characteristics with respect to the X-axis and the Y-axis. Further, it is also possible to effectively restrain vibration, whereby the optical axis can be adjusted with high accuracy.

The present invention is not restricted to the above-described embodiment. It is naturally possible to adopt other constructions embodying the technical idea of the present invention.

As is apparent from the above description, in the mirror holder, that is, the two-axis spring, of the present invention and the optical axis correcting device using the same, the deviation of the optical axis is coped with by directly controlling the angle of the mirror supported by the two-axis spring by using the X-axis and the Y-axis driving mechanism, so that backlash is eliminated, making it possible to effect a high-accuracy optical axis correction having an excellent responsiveness.

Further, the X-axis and the Y-axis of the two-axis spring and the rolling direction of the member have the same angle and, further, a vibration restraining member is provided at the rotating position, so that the mirror provided on the two-axis spring can be controlled in a stable manner and with high accuracy, whereby the reliability of the optical communication device is improved.

What is claimed is:

1. A mirror holder formed of rolled members, comprising
   a first annular section for setting the mirror,
   a second annular section on the outer side of the first annular section and concentric thereto, and
   a third annular section on the outer side of the second annular section and concentric thereto,
   wherein the first annular section and the second annular section are connected together by a pair of first connecting sections which allow torsional rotation and which are opposed to each other with the center of the concentric circle therebetween,
   wherein the second annular section and the third annular section are connected together by a pair of second connecting sections which allow torsional rotation and which are opposed to each other with the center of the concentric circle therebetween,
   wherein the first connecting sections and the second connecting sections are arranged at a predetermined angle by using the center of the concentric circles as a reference, and
   wherein the first connecting sections and the second connecting sections are arranged so as to exhibit the same angle with respect to the rolling direction of the rolled members using the center of the concentric circles as a reference.

2. A mirror holder according to claim 1, wherein members for restraining vibrations are attached to the first connecting sections and the second connecting sections.

3. A mirror holder according to claim 2, wherein a semi-curing type resin adhesive is adopted as the members for restraining vibrations.

4. An optical axis correcting device comprising
   a mirror holder as claimed in claim 1,
   a mirror attached to the first annular section of the mirror holder,
   a frame to which the third annular section of the mirror holder is fastened,
   a driving device which rotates the mirror by using the first connecting sections and the second connecting sections as independent rotation axes,
   a rotation angle detecting device for detecting the rotation angle of the mirror, and
   a limiting device for limiting the rotation angle of the mirror.

* * * * *